US 8,854,482 B2

United States Patent
Molgaard

(10) Patent No.: US 8,854,482 B2
(45) Date of Patent: *Oct. 7, 2014

(54) DIGITAL CAMERA WITH INTEGRATED ACCELEROMETERS

(75) Inventor: Claus Molgaard, Naerum (DK)

(73) Assignee: Phase One A/S, Frederiksberg (DK)

( * ) Notice: Subject to any disclaimer, the term of this patent is extended or adjusted under 35 U.S.C. 154(b) by 736 days.

This patent is subject to a terminal disclaimer.

(21) Appl. No.: 13/094,304

(22) Filed: Apr. 26, 2011

(65) Prior Publication Data

US 2011/0205377 A1   Aug. 25, 2011

Related U.S. Application Data

(60) Division of application No. 12/624,451, filed on Nov. 24, 2009, now Pat. No. 8,189,058, which is a division of application No. 12/472,478, filed on May 27, 2009, now Pat. No. 8,102,429, which is a continuation of application No. 10/847,354, filed on May 18, 2004, now Pat. No. 7,554,578, which is a continuation-in-part of application No. 09/897,435, filed on Jul. 3, 2001, now Pat. No. 6,747,690.

(60) Provisional application No. 60/217,023, filed on Jul. 11, 2000.

(51) Int. Cl.
*H04N 5/228* (2006.01)
*H04N 5/76* (2006.01)
*H04N 5/222* (2006.01)
*H04N 5/232* (2006.01)
*G03B 17/00* (2006.01)
*H04N 1/409* (2006.01)
*H04N 1/387* (2006.01)

(52) U.S. Cl.
CPC ............ *G03B 17/00* (2013.01); *H04N 5/23293* (2013.01); *H04N 5/23267* (2013.01); *H04N 5/23258* (2013.01); *H04N 1/4092* (2013.01); *H04N 1/3878* (2013.01)
USPC ................. 348/208.3; 348/231.3; 348/333.01

(58) Field of Classification Search
CPC ............. H04N 5/222; H04N 5/23248; H04N 5/23251; H04N 5/23258; H04N 5/23261; H04N 5/23264; H04N 5/23267; H04N 5/2327; H04N 5/23274; H04N 5/23287
USPC .......... 348/208.1, 208.2, 208.3, 231.2, 231.3, 348/231.6, 333.01, 333.11, 333.04, 333.03
See application file for complete search history.

(56) References Cited

U.S. PATENT DOCUMENTS 4,448,510 A   5/1984   Murakoshi
4,623,930 A   11/1986  Oshima et al.
(Continued)

FOREIGN PATENT DOCUMENTS

DE   19531289 A1   2/1997
EP   0608685       3/1994
(Continued)

OTHER PUBLICATIONS

Analog Devices Announces Two Design Wins for Versatile Micromachined Sensors, retrieved from archive.org Apr. 28, 1999 entry of http://www.analog.com.*

*Primary Examiner* — Nicholas Giles
(74) *Attorney, Agent, or Firm* — Volentine & Whitt, PLLC

(57) ABSTRACT

A digital camera system has integrated accelerometers for determining static and dynamic accelerations of the digital cameral system. Data relating to static and dynamic accelerations are stored with recorded image data for further processing, such as for correcting image data for roll, pitch and vibrations and for displaying recorded images with a predetermined orientation using information about, e.g., roll. Data may also be used on-the-fly for smear suppression caused by vibrations.

17 Claims, 7 Drawing Sheets

(56) References Cited

U.S. PATENT DOCUMENTS

| | | |
|---|---|---|
| 4,959,725 A | 9/1990 | Mandle |
| 4,967,278 A | 10/1990 | Greenbaum |
| 5,029,473 A | 7/1991 | Jost et al. |
| 5,155,520 A | 10/1992 | Nagasaki et al. |
| 5,227,889 A | 7/1993 | Yoneyama et al. |
| 5,274,418 A | 12/1993 | Kazami et al. |
| 5,413,028 A | 5/1995 | Ng et al. |
| 5,587,558 A | 12/1996 | Matsushima |
| 5,587,737 A | 12/1996 | Sekine et al. |
| 5,649,237 A | 7/1997 | Okazaki |
| 5,732,289 A | 3/1998 | Tsukahara et al. |
| 5,764,770 A | 6/1998 | Schipper et al. |
| 5,794,078 A | 8/1998 | Okazaki |
| 5,831,670 A | 11/1998 | Suzuki |
| 5,835,137 A | 11/1998 | McKeown |
| 5,881,321 A | 3/1999 | Kivolowitz |
| 5,900,909 A | 5/1999 | Parulski et al. |
| 5,966,549 A | 10/1999 | Hara et al. |
| 5,978,600 A | 11/1999 | Takeuchi et al. |
| 5,982,421 A | 11/1999 | Inou et al. |
| 6,028,608 A | 2/2000 | Jenkins |
| 6,067,420 A | 5/2000 | Hara et al. |
| 6,148,149 A | 11/2000 | Kagle |
| 6,154,611 A | 11/2000 | Washisu |
| 6,334,063 B1 * | 12/2001 | Charlier et al. .............. 455/566 |
| 6,473,123 B1 | 10/2002 | Anderson |
| 6,477,421 B1 | 11/2002 | Andersen et al. |
| 6,542,824 B1 * | 4/2003 | Berstis ........................ 701/472 |
| 6,597,817 B1 * | 7/2003 | Silverbrook ................. 382/289 |
| 6,930,708 B1 | 8/2005 | Sato et al. |
| 6,968,094 B1 | 11/2005 | Gallagher |
| 7,164,432 B1 * | 1/2007 | Amemiya ..................... 345/649 |
| 7,218,675 B1 | 5/2007 | Takahashi |
| 8,619,146 B2 * | 12/2013 | Molgaard ................... 348/208.6 |
| 2001/0007469 A1 | 7/2001 | Fuchimukai et al. |
| 2001/0038749 A1 | 11/2001 | Imada |

FOREIGN PATENT DOCUMENTS

| | | |
|---|---|---|
| EP | 0738075 A2 | 10/1996 |
| EP | 0851675 A2 | 7/1998 |
| FR | 2794524 | 8/2000 |
| JP | 58222382 | 12/1993 |
| WO | 9624216 | 8/1996 |
| WO | 9826585 | 6/1998 |
| WO | 0071981 | 11/2000 |
| WO | 0120571 | 3/2001 |

* cited by examiner

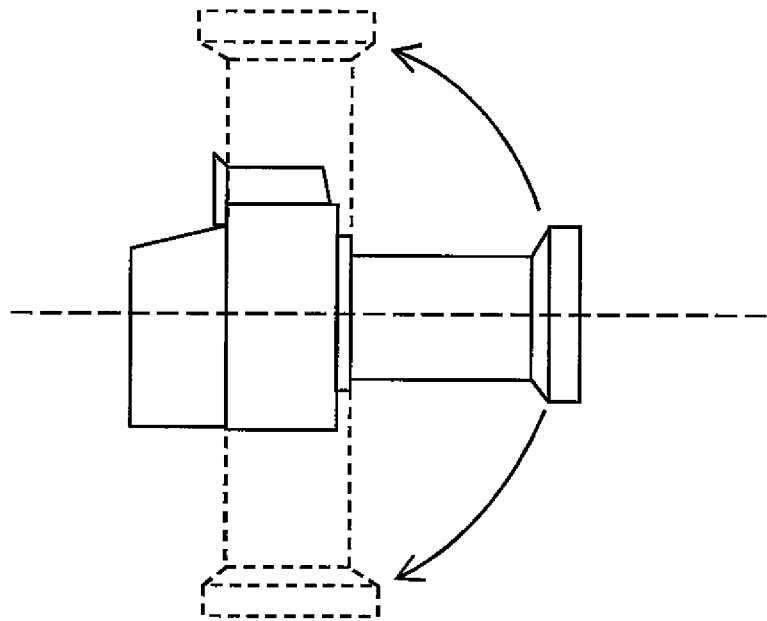
FIG. 5: PITCH WORKING RANGE WITH TWO AXISES
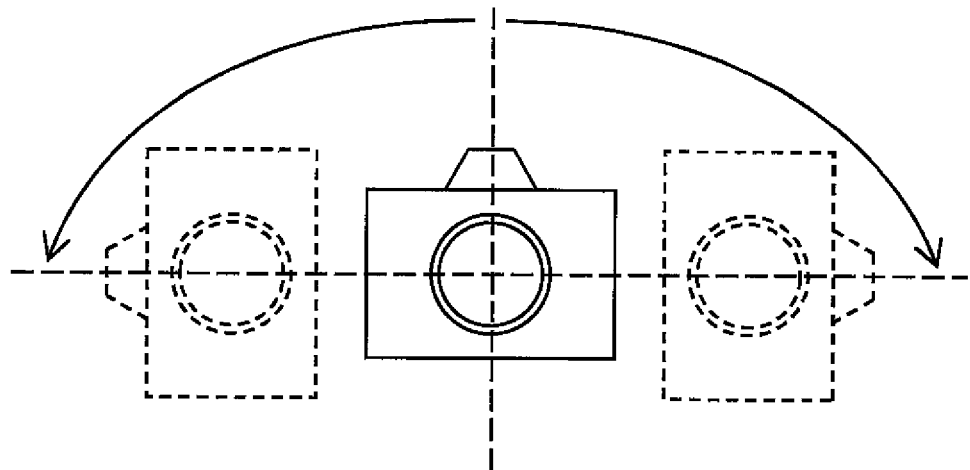
FIG. 6: ROLL WORKING RANGE WITH TWO AXISES

DIGITAL CAMERA WITH INTEGRATED ACCELEROMETERS

CROSS-REFERENCE TO RELATED APPLICATION

This is a divisional application of application Ser. No. 12/624,451, filed on Nov. 24, 2009, which is a divisional application of application Ser. No. 12/472,478, filed on May 27, 2009, which is a continuation application of application Ser. No. 10/847,354, now U.S. Pat. No. 7,554,578, filed on May 18, 2004, which is a continuation-in-part application of application Ser. No. 09/897,435, now U.S. Pat. No. 6,747,690, filed on Jul. 3, 2001, which claims priority under 35 U.S.C. 119(e) to Provisional Application Ser. No. 60/217,023 filed on Jul. 11, 2000, the entire contents of which are hereby incorporated by reference in their entirety for all purposes.

FIELD OF INVENTION

The present invention relates to a digital camera system having integrated accelerometers for determining static and dynamic accelerations of said digital camera system. Data relating to the determined static and dynamic accelerations are stored with recorded image data for further processing, such as for correcting image data for roll, pitch and vibrations. Data may also be used on-the-fly for smear suppression caused by vibrations.

BACKGROUND OF THE INVENTION

When using rectangular film formats like the 35 mm format, images are recorded on film with a "landscape" (horizontal) orientation in respect to the common way of holding a camera. When the photographer wishes to capture a portrait he will tilt the camera 90 degrees and thus acquire an image with a "portrait' (vertical) orientation. Later when the developed images are viewed, the viewing person will manually orient them correctly. Since the images are on paper, it is relatively easy to reorient some of them.

In digital photography the landscape orientation is the default setting for most cameras. When the captured images are viewed on a display, they will appear with a landscape orientation with no respect to whether the images were actually captured with the camera held in a portrait or landscape orientation. The images then have to be manually inspected and later possibly rotated to reflect their original orientation. Some digital camera manufacturers are now beginning to include a sensor unit, which detects whether the camera is placed in landscape or portrait position when an image is captured.

In U.S. Pat. No. 5,900,909 an orientation detector which consists of two mercury tilt switches is described. The two mercury switches make it possible to determine whether the user is holding the camera in the normal landscape orientation or in a portrait orientation. There are two portrait orientations: One is the result of a clockwise rotation whereas the other is the result of a counter clockwise rotation. The use of mercury switches has some distinct disadvantages in that mercury can cause great damage when it interacts with the human body, and for that reason it is quite unpopular in many products. Mercury switches usually consume a lot of space in comparison with monolithic IC's. This is due to their very mechanic structure, which makes miniaturisation difficult. In a digital camera it is crucial to minimise the size and weight, so in respect to this, the use of mercury and other primarily mechanically based switches, is not the optimum choice. A mercury switch based solution in a digital camera is limited to detecting a few rough orientations, i.e. landscape and portrait. The robustness and ease of use of the mercury switch are its primary advantages today.

The main limitation regarding micro-mechanical accelerometers fabricated in e.g. silicon is related to their ability to absorb shock without being damaged.

Taking pictures with long shutter times and maybe even a high degree of zoom makes the image capture process very sensitive to vibrations, which will result in blurred images. At short shutter times the image is less likely to be affected by vibrations since most vibrations, which will affect a camera, have an upper frequency limit, due to mechanical damping from the surroundings. Especially handheld photography easily results in blurred images when longer shutter speeds are used. One solution to the described limitations is to be able to compensate for most vibrations. Vibrations can be compensated optically by means of a lens module, which is capable of moving the projected image around in the image focus plane. This requires a special and expensive lens.

When vibrations cannot be compensated, another way of helping the photographer to acquire the optimum images is to inform him about any possibility of blurring, which may have occurred in a captured image. With feedback from the camera regarding the degree of shaking during the exposure time, it is possible for the photographer to decide whether he wants to capture another image of the same scene.

In U.S. Pat. No. 4,448,510, a camera shake detection apparatus is described. It includes an accelerometer, which is connected to a control circuit, which activates an alarm, when the acceleration exceeds a certain predefined threshold level. The threshold level can be influenced by the exposure time—a long exposure time results in a low threshold level and vice versa for a short exposure time. The output from the accelerometer may also be forced through an integrator before comparing the output to a threshold level to account for the fact that blurring is more probable to occur if a large number of high accelerations are detected. None of the described implementations are able to determine if the camera after a short period of vibrations returns to its initial position or the position where the majority of the exposure time has been spent. In such a case the suggested implementations would generate a "blur" alarm, even though the image could be sharp.

In some applications, especially the more technically oriented, it can be an advantage to have knowledge about how the camera is physically oriented in space. In a set-up with a digital camera connected to a GPS receiver, knowledge about the roll and pitch of a camera can be used to automatically pin point the scene being photographed. This can be used in aerial photography and other related technical applications. In other set-ups, feedback to the photographer about the exact roll and pitch can be useful for him to correct his orientation of the camera. Another use of the roll information is to automatically correct for small degrees of slant in the sideways direction. In most common photographic situations it is not desirable to have an automatic correction of a slight slant, as the photographer often wants full control of the image orientation. A feature like automatic slant correction should be user configurable in the sense that it can be turned off and on.

JP 58-222382 discloses an apparatus that automatically corrects inclination of scanned originals by changing the address where the image data is written to reflect the original with no inclination. Inclination is measured by using feedback from a couple of timing marks, which are connected to the slant of the original. Measuring the inclination through the use of timing marks is not useful in digital still photography.

General image rotation in software is carried out by moving the original image data to a new position in another image file/buffer.

The present invention may be implemented in a digital still camera or a digital still camera back and supply a total solution which is very compact, consumes little power, and is applicable in a variety of digital still camera applications. The use of a single detector unit for a variety/plurality of functions decreases the physical size, lowers the power consumption, and keeps the price down. The use of a micro-mechanical accelerometer as opposed to a mercury switch has the distinct advantage that it does not contain mercury.

The micro-mechanical accelerometer has several advantages over the mercury switch and the pendulum based orientation detector. Some of these advantages are:

it can easily be miniaturised, it is a measurement device with a high degree of accuracy which can be configured dynamically for a variety of applications through the use of different processing which can be integrated in a digital processing unit or analogue electronics, it may be applied to measure both static and dynamic acceleration at the same time. In comparison, the mercury switch and the pendulum are both optimised for measuring static orientation.

With the integration of more than one measurement axis in a silicon-based chip it becomes possible to measure both dynamic and static acceleration in several directions at the same time. The static acceleration is basically obtained by low-pass filtering the raw outputs from the accelerometer(s). More sophisticated filtering can be applied to handle specific requirements. With static acceleration from at least two axes—which are perpendicular to each other—it is possible to obtain the precise degree of both roll and pitch for a digital still camera. This may be used in technical applications for automatic or manual correction of slant in both sideways and forwards directions. Mercury switches or pendulums are limited to a more rough evaluation of the orientation of the camera (basically limited to two positions).

A subset of the before-mentioned static acceleration measurement feature is the possibility to automatically determine when an image should be displayed with portrait or landscape orientation. The high precision of the roll and pitch information makes it possible to determine the correct orientation under the most difficult conditions where a slight mechanical tolerance for a mercury switch or pendulum based solution easily would result in an unexpected determination of orientation.

The mercury switch and pendulum switch based solutions lack the possibility to be dynamically configured to each users need, as their functionality is fixed mechanically when they leave the factory. An example of this could be a user who wishes that his camera should display images with a landscape orientation until he tilts the camera 75 degrees, whereas the normal configuration would be to display an image with a portrait orientation when the camera is tilted more than 45 degrees.

The measurements of dynamic acceleration (vibration) during the time of exposure may be used in a variety of ways to reduce the possibility of the photographer taking a blurred image. The use of active compensation for camera movements can be used to extend the previous working range for photography in terms of longer exposure time, more zoom, and the ability to capture images in vibration dominated surroundings, i.e. helicopters.

With a traditional film camera it is necessary to have an expensive lens which corrects the induced vibrations by changing the optical path of incident light. When the vibrations are compensated either by plain image processing with input from the recorded movements, or by active compensation through movement of charges in the image sensor, or by physically moving the image sensor itself, all the outlined compensation solutions described in detail below, enable the use of any type of lens, and are still able to reduce blur. The addition of a little extra image processing to compensate for vibrations through post-processing, or the use of charge movement in the sensor, does not increase the manufacturing cost, as opposed to a solution which changes the optical path.

When using accelerometers, generation of a "blur" warning is much more fail safe than earlier solutions which were not able to determine if the camera after a short period of vibrations would return to its initial position or the position where the majority of the exposure time had been spent. In such a case the earlier implementations would generate a "blur" alarm, even though the image could be sharp.

SUMMARY OF THE INVENTION

The present invention is therefore directed to a digital still camera which substantially overcomes one or more of the limitations and disadvantages of the related art. More particularly, the present invention is directed to a digital still camera with a sensor unit for determining static and dynamic accelerations, and methods thereof which substantially overcomes one or more of the limitations and disadvantages of the related art.

It is an object of the present invention to provide a sensor unit to digital cameras which is very compact, consumes little power, and is applicable in a variety of digital camera applications.

It is a further object of the present invention to provide a sensor unit to digital cameras capable of providing the following features:

Low-pass filtering the accelerometer outputs enables exact measurement of roll and pitch which can be used in technical applications for automatic or manual correction of slant in both sideways and forwards directions. The roll and pitch information is also useful in applications where knowledge of the camera shooting direction is needed, i.e. aerial photography.

A subset of the before mentioned feature is the possibility to automatically determine when an image should be displayed with portrait or landscape orientation.

A processing unit evaluates the raw accelerometer outputs during the time of exposure. The processing unit evaluates whether or not the measured vibrations may result in an image, which appears to be blurred. The photographer may receive a warning in case the processing unit finds that blur is highly likely to occur in the captured image.

The raw accelerometer outputs can also be used to keep track of the movements of the camera with respect to the field of gravity. When the image is processed afterwards it is possible to correct the image for blur by using the record of camera movements during the exposure time. During the exposure time, the camera movements can be actively compensated by moving charges (pixel information) in the image sensor in a direction to follow the movements of the projected image in the image plane. The movement of charges in the image sensor can be combined or replaced with mechanical actuators to physically move the image sensor.

In some cases a little blur may be advantageous to reduce the amount of Moiré image defects which may be introduced when an image is extremely sharp. Using the knowledge about the camera movements during the time of exposure it is possible for the image processor to generate an image with less tendency to show Moiré without the full reduction of sharpness.

A processor receives at least static acceleration data to continuously or at short intervals evaluate the camera's present orientation in comparison with a pre-set orientation, and to indicate a difference between these.

In a first aspect, the present invention relates to a sensor unit to a digital camera, said sensor unit includes a detector which determines static and dynamic accelerations. The detector includes, a first sensor which senses acceleration in a first direction, and provides a first output signal in response to acceleration in the first direction; and a second sensor which senses acceleration in a second direction and provides a second output signal in response to acceleration in the second direction, the second direction being different from the first direction. The sensor unit also includes a processor which processes the first and second output signals. The processor includes a first filter which low-pass filters the first and second output signals so as to obtain information relating to static accelerations, and a second filter which band-pass filters the first and second output signals so as to obtain information relating to dynamic accelerations.

The first and second directions may be perpendicular to each other. The sensor unit may further include a third sensor which senses acceleration in a third direction and provides a third output signal in response to acceleration in the third direction, the third output signal being provided to the processor so as to obtain information relating to static and dynamic accelerations. The third direction may be perpendicular to the first and second directions.

The sensor unit may further include an alarm, which may generate an alarm signal in response to at least one of the output signals from the sensor. The alarm signal may be generated when at least one of the output signals exceeds a predetermined level which may relate to the fact that an image starts to get blurred or relate to a certain amount of exposure time. The alarm signal may be constituted by a sound signal, a flashing signal, an image file tag or any combination thereof.

At least one of the sensors may include a micro-mechanical deflection system. The first, second and third sensors may be integrated in a single micro-mechanical deflection system mounted in the camera house of the digital camera—for example in a digital camera back.

At least one of the above and other objects may be realized by providing a method of determining static and dynamic accelerations in a digital camera, the method including:
providing a first sensor sensitive to acceleration in a first direction, said first sensor being adapted to provide a first output signal in response to acceleration in the first direction,
providing a second sensor sensitive to acceleration in a second direction, said second sensor being adapted to provide a second output signal in response to acceleration in the second direction, the second direction being different from the first direction,
low-pass filtering the first and second output signals so as to obtain information relating to static accelerations, and
band-pass filtering the first and second output signals so as to obtain information relating to dynamic accelerations.

The method may further include providing a third sensor sensitive to acceleration in a third direction. The third sensor provides a third output signal in response to acceleration in the third direction, the third output signal being provided to the processor so as to obtain information relating to static and dynamic accelerations.

The first, second and third directions may be essentially perpendicular. The method according to the second aspect may further include generating an alarm signal as mentioned in relation to the first aspect of the present invention.

At least one of the above and other objects may be realized by providing a digital camera including
an image recording device, the image recording device comprising a plurality of light sensitive elements,
a first translator which translates the image recording device in a first direction in response to a first input signal,
a sensor unit according as set forth above, wherein the band-pass filtered first output signal from the first sensor is provided as the first input signal to the first translator so as to compensate for determined dynamic accelerations in the first direction.

The digital camera may further include
a second translator which translates the image recording device in a second direction in response to a second input signal, the second direction being different from the first direction,
a sensor unit as set forth above, where the band-pass filtered second output signal from the second sensor is provided as the second input signal to the second translator so as to compensate for determined dynamic accelerations in the second direction.

The first and second directions may be essentially perpendicular. The first and second translators may translate the image recording device in a plane substantially parallel to a plane defined by the plurality of light sensitive elements. The first and second translators may comprise micro-mechanical actuators.

At least one of the above and other objects may be realized by providing a method of processing image data, the method including:
providing image data, the image data being stored in a memory,
providing data or information relating to static accelerations as described above, providing data or information being recorded and stored with the image data, and
correcting the image data in accordance with the data or information relating to static accelerations so as to correct the image data and reduce the influence of roll and pitch.

Alternatively, the roll and pitch information may be used to determine whether the optimum way of displaying the image is with a portrait or landscape orientation. At least one of the above and other objects may be realized by providing a method of correcting image data during recording of an image of an object, the method including:
recording image data of the object by projecting the object onto an array of light sensitive elements, recorded image data being generated as electrical charges in the array of light sensitive elements,
providing information relating to time dependent movements of the array of light sensitive elements relative to the object, and
correcting the recorded image data in accordance with the provided information relating to movements of the array of light sensitive elements relative to the object by moving charges (pixels) in the array of light sensitive elements so as to correct for relative movements between the array of light sensitive elements and the image of the object.

At least one of the above and other objects may be realized by providing a method of displaying a recorded image with a predetermined orientation, the method including:

providing information relating to the degree of roll of the recorded image, the information being provided by first and second sensor means sensitive to accelerations in a first and a second direction, respectively, the second direction being different from the first direction, and using the provided information to determine the orientation by which the recorded image is to be displayed and/or stored.

The orientation by which the recorded image is to be displayed and/or stored may comprise portrait and landscape orientations. The user may determine at which predetermined acceleration levels the recorded image toggles between portrait and landscape orientation. The predetermined acceleration levels may correspond to a predetermined degree of roll of the recorded image.

At least one of the above and other objects may be realized by providing a method of correcting image data during recording of an image of an object, the method including:

recording image data of the object by projecting an image of the object onto an array of light sensitive elements, providing information relating to time dependent movements of the array of light sensitive elements relative to the image of the object, and correcting the recorded image data in accordance with the provided information relating to movements of the array of light sensitive elements relative to the image of the object by counter moving the array of light sensitive elements so as to compensate for the time dependent movements.

At least one of the above and other objects may be realized by providing a method of reducing Moiré image defects without full reduction in sharpness, the method including:

providing an array of light sensitive elements, recording an image of an object using the array of light sensitive elements, the image being affected by movements of the array of light sensitive elements relative to the object so that the recorded image appears to be blurred and without Moiré defects, providing information relating to time dependent movements of the array of light sensitive elements relative to the object during the time of exposure, and using the provided information as an input to an image processing algorithm so as to reduce Moiré image defects in the recorded image and thereby obtain a modified image with increased sharpness.

At least one of the above and other objects may be realized by providing a computer program including code adapted to perform the method according to the any of the above methods when the program is run in a computer. The computer program may be embodied on a computer-readable medium.

BRIEF DESCRIPTION OF THE DRAWINGS

The present invention will now be described with reference to the accompanying figures, where

FIG. 5 shows the pitch working range;

FIG. 6 shows the roll working range;

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention with unnecessary details.

Figure 1:
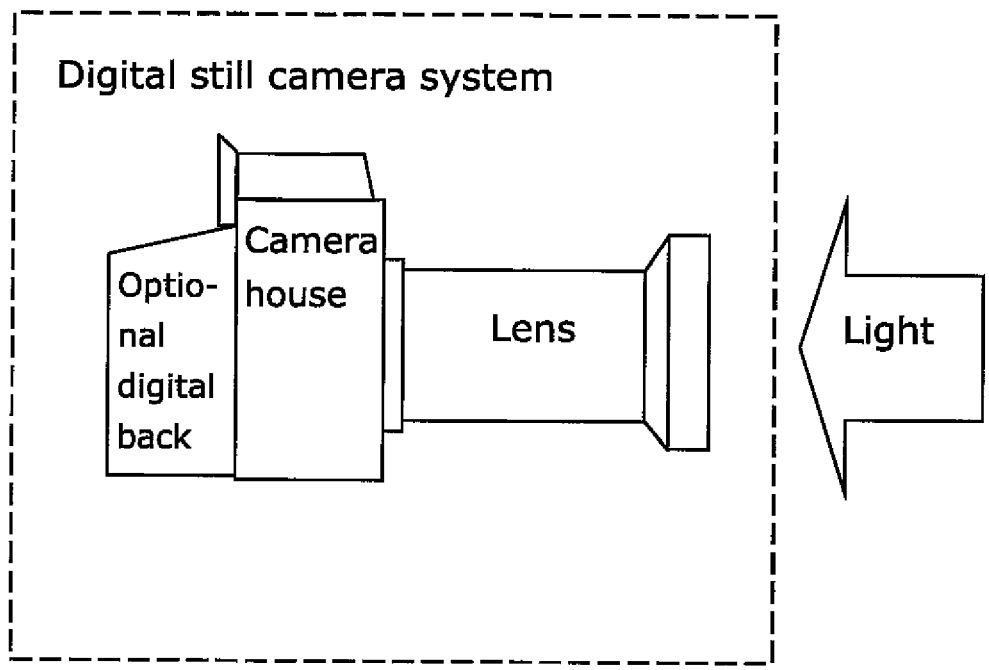
FIG. 1 shows a digital still camera system, where the digital back is optional.
Figure 2:
FIG. 2 shows roll and pitch of a digital camera with respect to the field of gravity.
Figure 3:
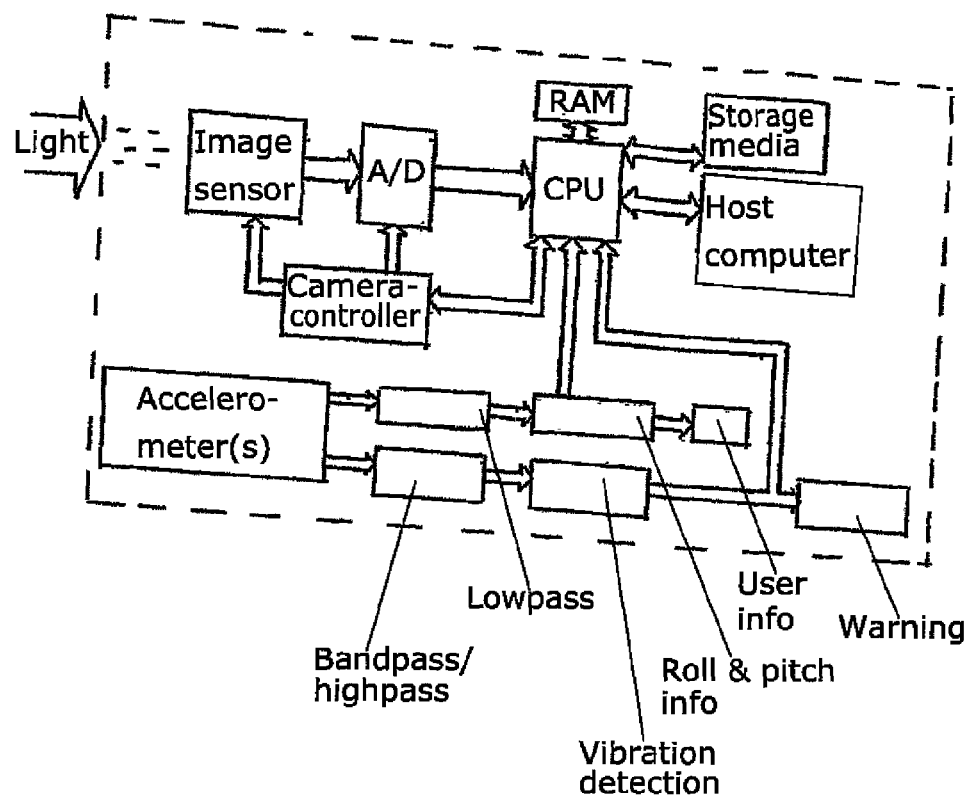
FIG. 3 shows a block diagram of a digital camera.

The digital still camera system as shown in FIG. 1, where the digital back is optional, incorporates a section which is able to determine the roll and pitch of the camera with respect to the field of gravity, see FIG. 2. The same section also monitors the vibrations, which occur during the time of exposure. A block diagram can be seen in FIG. 3. The sensor section is comprised of one or more accelerometers, which monitors acceleration in two or three axes placed perpendicular to one another. Together with a digital and/or analogue signal processing section it is possible for the camera to recognize both static acceleration (e.g. gravity) and dynamic acceleration (e.g. vibration) through the use of the same accelerometer unit(s). Preferably the accelerometers are in the same IC. The digital still camera system consists of a lens, a camera house, and in some cases of a digital camera back which is attached to the back of the camera house. The sensor section may be placed anywhere in the digital still camera system.

Preferably the accelerometer(s) are of the micro-machined type which is integrated in or on a monolithic structure. There are several ways to implement a micro-mechanical accelerometer. One is to form a cantilever in silicon with a very small thickness (μm range). When the entire structure of the device shakes or moves quickly up and down, for example, the cantilever remains still due to its inertia so that the distance between lever and a reference layer changes correspondingly. Such changes in distance between lever and reference layer may be sensed in terms of corresponding changes in electrostatic capacitance between two electrodes, where one is connected to the lever and the other to the reference layer.

Another principle uses piezo-resistors on the surface of the cantilever beams and their resistance is stress dependent. Acceleration causes a bending of the cantilever beams, which causes stress. Using two longitudinal and two transverse piezo-resistors, which have opposite signs of resistance changes, and connecting them to a Wheatstone Bridge makes it possible to get a signal voltage which is proportional to the acceleration.

For yet another type of micro-electromechanical accelerometer the sensor is a surface micro-machined structure built on top of the silicon wafer. Polysilicon springs suspend the structure over the surface of the wafer and provide a resistance against acceleration forces. Deflection of the structure can be measured by using a differential capacitor, which consists of independent fixed plates, and central plates attached to the moving mass. The fixed plates are driven by 180° out of phase square waves. Acceleration will deflect the beam and unbalance the differential capacitor, resulting in an output wave whose amplitude is proportional to acceleration. Phase sensitive demodulation techniques are then used to rectify the signal and determine the direction of the acceleration. The output of the demodulator is low pass filtered with a cutoff frequency, which sets the measurement bandwidth limit. A simple digital output signal can be obtained by letting the filtered output drive a duty cycle modulator stage.

One or more accelerometers which monitors two or three axes, which are perpendicular to one another, may advantageously be mounted in a digital still camera system. With the accelerometer(s) it is possible to determine both the roll and pitch of the camera with respect to gravity with a very high degree of accuracy.

Figure 4:
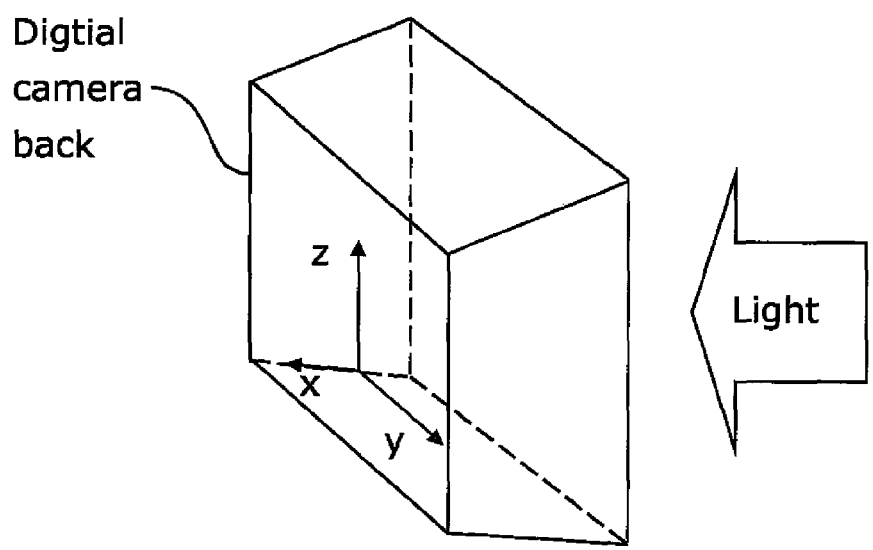
FIG. 4 illustrates two monitoring axes, where the x-axis is used to monitor the pitch, and 30 the y-axis is to monitor the roll.

When the accelerometer(s) is mounted with monitoring axes as shown in FIG. 4, the x-axis is used to monitor the pitch, and the y-axis is to monitor the roll. Using two axes, the camera movements can be monitored correctly as long as the camera is not upside down—the working range for both roll and pitch is a 180° rotation, which is most commonly used in photography. FIG. 5 shows the pitch working range and FIG. 6 shows the roll working range of a 2-axis system. With a 3-axis system, which also uses information from the z-axis, it is possible to achieve 360° roll and pitch rotation. The degrees of roll and pitch are preferably obtained during the time of exposure and after the accelerometer output typically has been heavily low pass filtered to prevent aliasing due to handshake, i.e. if the accelerometer which is being used contains pre-processing circuits that transforms the analogue output(s) from the basic sensor unit to digital output(s), it is in general most advantageous to use digital signal processing techniques to define the required measurement bandwidth, since it is easier to adapt and optimize for various shooting conditions in terms of varying exposure time and vibrations in the environment surrounding the shooting scene.

Figure 7:
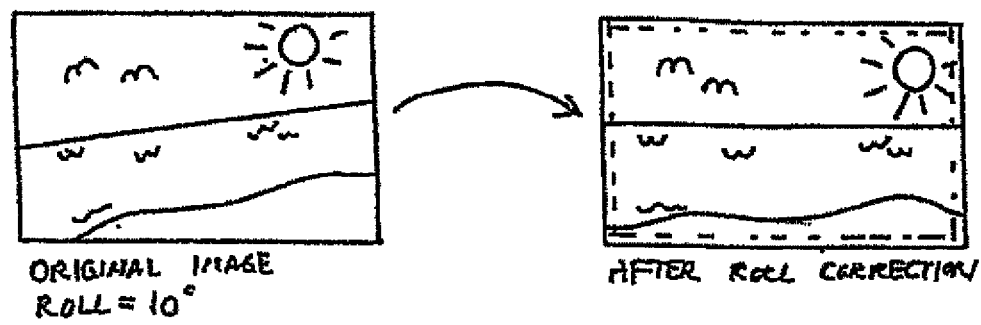
FIG. 7 shows an original image (left) and the image after correction (right)

The roll and pitch information is very accurate and can be used as feedback to the photographer to help him physically orient his camera correctly to obtain images without sideways or forwards slant, i.e., pendulum and mercury tilt sensors are not usually able to accomplish this without being physically very large, which makes them unsuited for digital still cameras. The photographer may choose to use a piece of post-processing software which automatically corrects a slight sideways slant in the image by rotating the image counter wise a certain amount of degrees, which is equivalent to the roll information that was recorded during the time when the image was captured. Finally the image may be automatically cropped to fit the frame. FIG. 7 shows an example.

Figure 8:
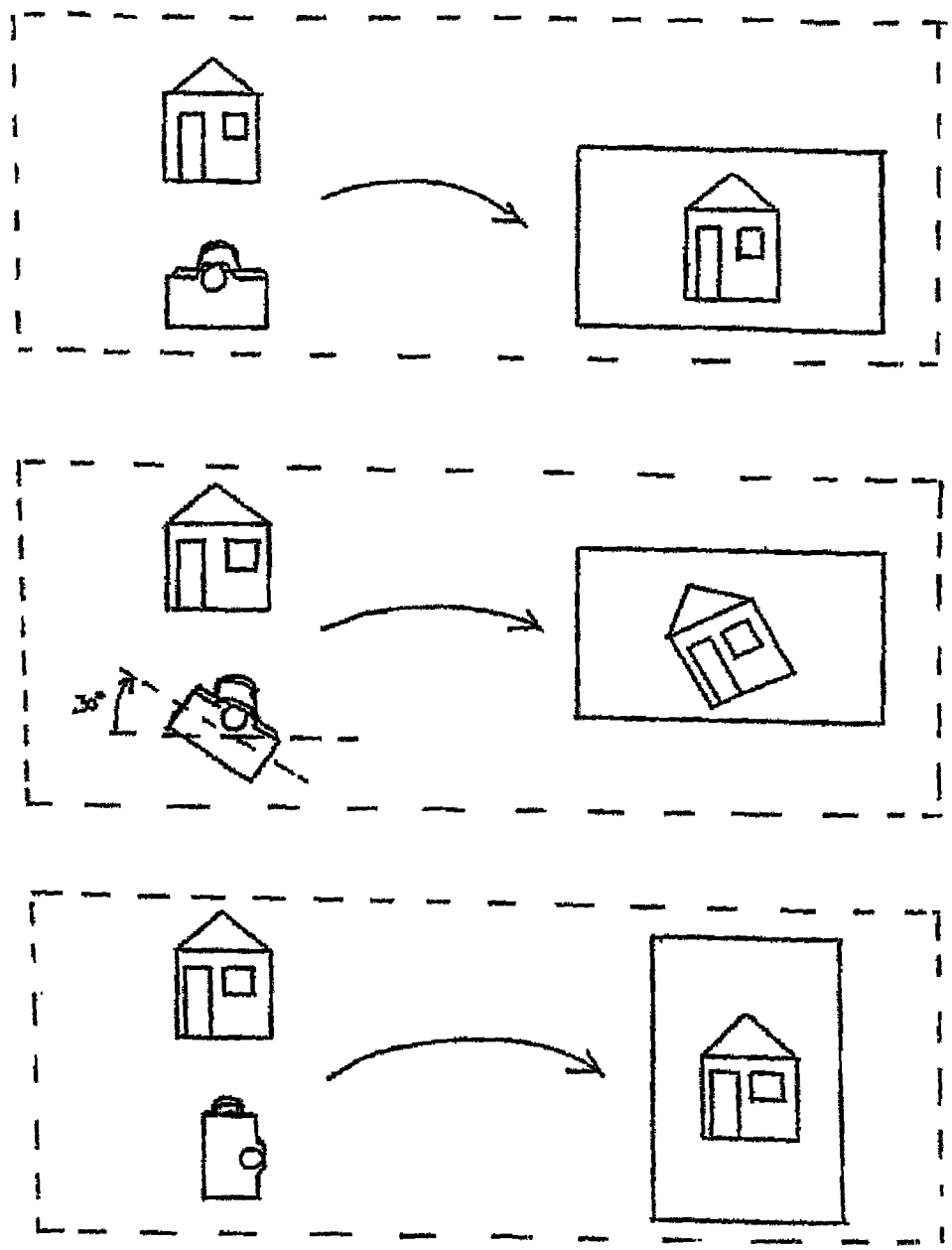
FIG. 8 shows how images, which are captured under different pitch and roll conditions, will be displayed.

Since both roll and pitch are measured, the photographer also has access to information about the pitch of the camera, and is thereby able to compensate for this manually or through the use of post-processing software. Knowledge about both sideways and forwards slant can be advantageous in many technical applications. The roll and pitch information, which is acquired during the time of exposure, is either embedded in the image file format or attached to a standard image file format. When the image file is displayed, the display software or a pre-processing algorithm can utilize the accurate roll and pitch information to determine the proper orientation of the image and display it either as a portrait or landscape picture. Hysteresis on the roll measurement is used to prevent unexpected switching between portrait and landscape display modes. See FIG. 8, which shows how images which are captured under different pitch and roll conditions will be displayed. The rough sideways rotation can be correctly determined in just about any situation—even when the camera is a couple of degrees from pointing straight to the ground or straight up in the air. If the pitch of the camera shows that the photographer is shooting straight up in the air or straight to the ground, it doesn't make sense to use the roll information to determine how the image should be displayed, instead the image is displayed in landscape, which is most often the natural orientation of a camera image plane. This eliminates the possibility of unexpected rotation of the image when displayed. Without the described check on the pitch reading, images which are captured with the camera pointing straight up or down with almost the same physical orientation may be displayed with different orientations. This is sometimes the case when using pendulum or mercury based tilt sensors.

Using an image sensor, which enables readout of pixels from each corner in two directions, it is possible to rotate an image without the use of a large temporary storage media (RAM), that way relieving system resources and reducing the overall system overhead. Image information is read straight from the image sensor, which will result in an image with the proper rough orientation (landscape, portrait clockwise, and portrait counter clockwise) as determined by the roll and pitch information which was stored during the time of exposure.

The roll and pitch information can be updated continuously or regularly (e.g. several times per second) to inform the photographer about the present orientation of the camera. This feature has a number of applications.

A first application of the continuously updated orientation information is as an electronic spirit level which can help the photographer to capture images which are perfectly aligned with the horizon. The roll and pitch information can be presented to the user in various ways. The above outlined procedure can also be used to help the photographer capture images that are aligned with plumb objects.

A second useful application is to have a memory function equivalent to e.g. man-over-board functions of Global Positioning Systems where the system guides the user back to a previous position. When a user record images with the camera having a given orientation, the roll and pitch information, which is acquired during the time of exposure, is stored. When, at a later stage, the user wants to restore the photographic set-up of the previous recording, recalling the stored roll and pitch information will allow the system to guide the user to position the camera with the same orientation. The roll and pitch information from the previous recording may be stored in a file related to the previously captured image data, or may, upon activation of an orientation memory function at the previous recording, be stored in a dedicated orientation memory. This function may be applied e.g. when making a series of images of an object from different positions or at different points in time, when recording time lapse movies as well as when shooting moving pictures, where the shooting angle needs to be kept constant between different takes.

Figure 12:
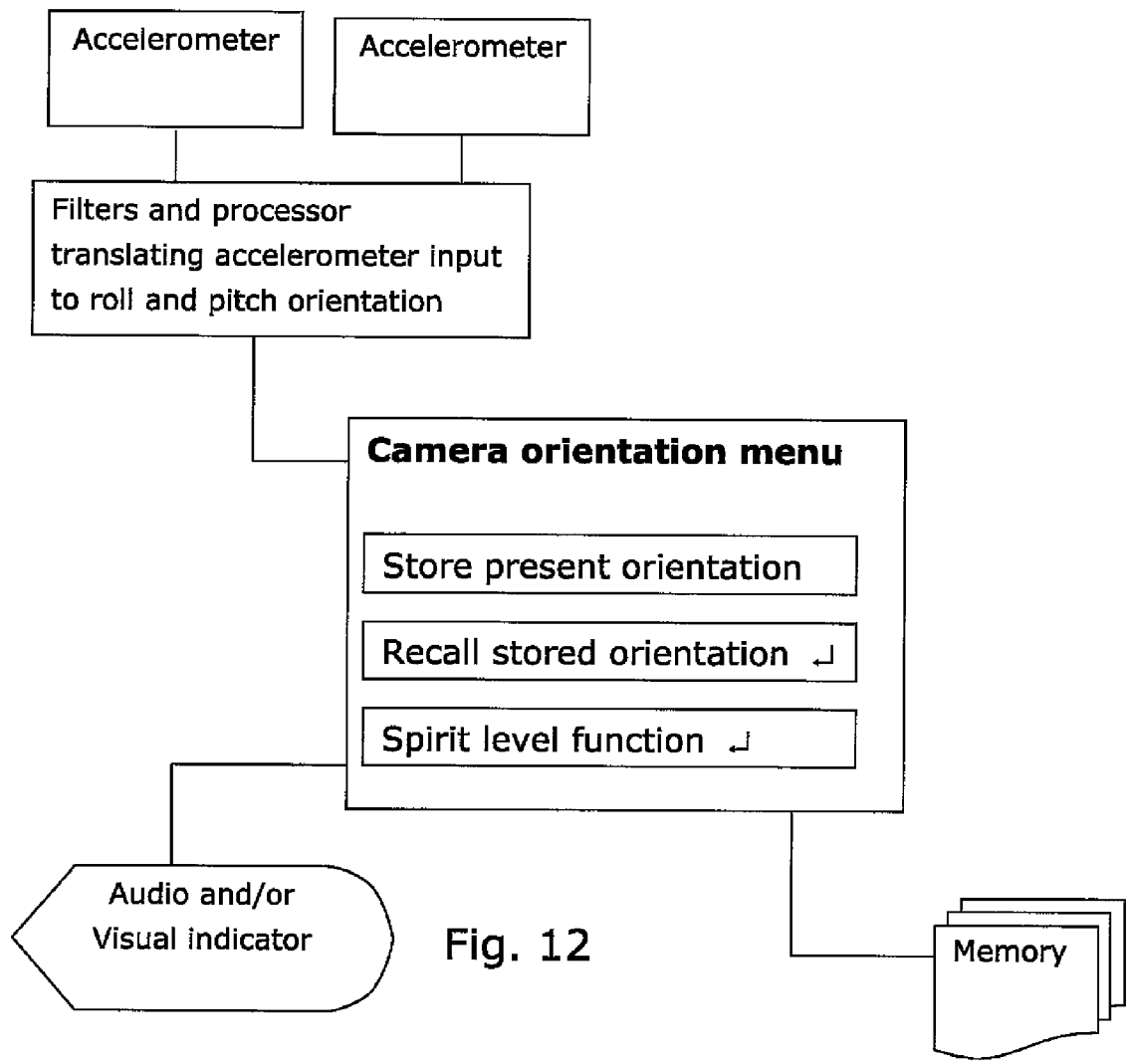
FIG. 12 shows the camera orientation function embodied by a processor.

The applications related to the continuously updated orientation information of the camera may be embodied as shown in FIG. 12. The camera orientation function is embodied by a processor illustrated and controlled by the camera orientation menu. The processor can receive continuously updated information relating to static accelerations from another processor (or from another program controlled by the same processor) receiving input from the two accelerometers. The received information relating to static accelerations corresponds to the present orientation of the camera in roll and pitch.

Upon activation of the 'Store present orientation' functionality, the camera orientation function stores present roll and pitch information in the memory. Upon activation of the 'Recall stored orientation' functionality, the camera orientation function obtains stored roll and pitch information from the memory, and correlates these data with the present roll and pitch information to give an indication to the user which guides the user to orient the camera. The indication is given via the Audio and/or Visual indicator. Upon activation of the 'Spirit level' functionality, the camera orientation function correlates the present roll information with a pre-set roll value corresponding to horizontal orientation.

The camera orientation function is adapted to correlate the updated orientation information with the stored orientation information, and can generate correlation signals indicating a relative difference between the updated and stored information. Typically, there will be correlation signals relating both to the roll orientation and to the pitch orientation.

Figure 13:
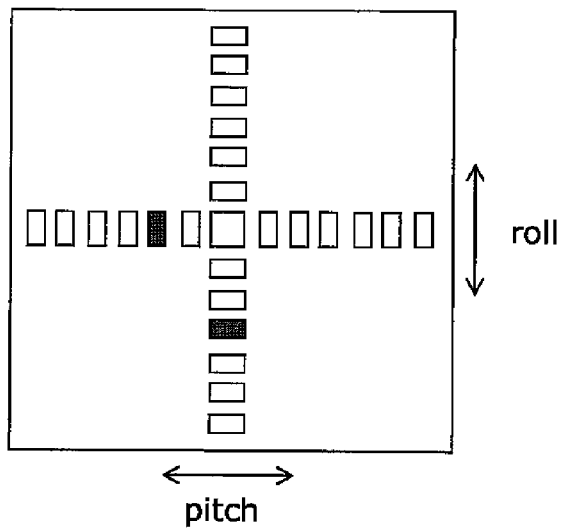
FIG. 13 shows a visual indicator that indicates changes in orientation of the camera towards or away from the stored orientation.

The indicator generates an output based on the correlation signals from the camera orientation function. This output is adapted to guide a user to orient the digital camera so that the updated (i.e. present) orientation information is at least substantially equivalent to the stored orientation information. The output is adapted in that it indicates a continuously or regularly updated difference between the present orientation information and the stored orientation information, so that, when the user changes the orientation of the camera, the output changes in a manner so that the user understands whether he/she changes the orientation of the camera towards or away from the stored orientation. The indicator may be a visual indicator such as a graphical illustration such as shown in FIG. 13 shown on a LCD on the camera. Another visual indicator is a mechanical device equivalent to what is known from gyroscopes in airplanes. An audio indicator may be a frequency or amplitude modulator connected to a speaker. The modulator increasing the frequency or amplitude of a sound as the camera system is getting closer to being perfectly aligned with the predetermined orientation.

The accelerometer(s) serve double duty, as their output(s) are also being used to determine the vibrations (dynamic acceleration) which occur during exposure. Vibration information is basically obtained using the raw accelerometer output or maybe by applying some high or band-pass filtering of the output(s) from the accelerometer(s). The filter can be both analogue and digital, typically with the digital filter as the smallest and with the ease of adaptability.

Vibrations during the exposure time will blur the captured image, and are therefore usually unwanted. The image is most sensitive to vibrations when the exposure time is relatively long or when the photographer zooms in heavily. Whether or not the vibrations, which occur during exposure, will affect the final image depends upon the nature of the vibrations. If the camera is placed in the same steady position for 99.9% of the exposure time, and shakes severely for the remaining 0.1% of the exposure time, the final image will not look blurred. Whereas an image will look blurred when it has been captured with the camera in the same steady position for 50% of the exposure time, and the remaining 50% of the exposure time the camera is physically slightly offset from its initial position. The point is that high acceleration can be accepted for a short amount of time (in respect to the exposure time) as long as the camera returns to its original position, or the position where the majority of the exposure time has been spent.

Naturally the photographer would prefer that vibrations are removed by mechanical means, but in some cases, i.e. handheld photography, it is not possible. Another way to reduce/remove blur is to monitor the movements of the camera during the exposure time and compensate for the movements by either moving the image which is projected on the image plane or by moving the imaging sensor.

The vibration information from the accelerometer axes during the exposure time can be used as feedback to reduce the blur in the captured image. Information about acceleration over time along with information about the optics, which generates the image in the imaging plane, will enable blur to be removed/reduced in many ways. The following described methods can be used individually or in combination with one another.

Using the knowledge about how the projected image moves around in the imaging plane over time, it is possible to mathematically reconstruct the original image by calculating "backwards" from the final image. This solution requires a total log of measured accelerations from the accelerometer(s) axes.

Figure 9:
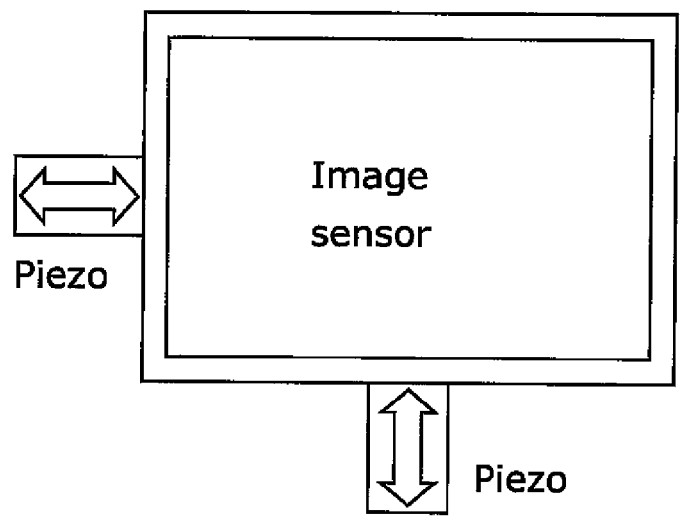
FIG. 9 illustrates how the imaging sensor can be moved in one or more directions in the imaging plane using piezo elements or other exact micro-positioning devices.

The imaging sensor can be moved in one or more directions in the imaging plane using piezo elements or other exact micro-positioning devices, see FIG. 9. Thus, it will try to follow the way the projected image moves around in the imaging plane. A solution with two piezo elements takes up quite a bit of space, is expensive, and uses quite a bit of power.

Figure 10:
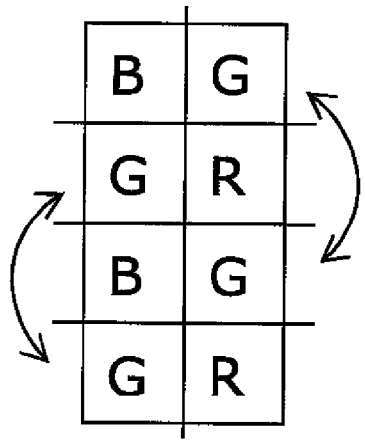
FIG. 10 illustrates how charges may be moved up or down two rows at a time to match a color filter pattern.

The charges (pixels) in the image sensor can be moved up and down to follow the movements of the projected image in the vertical direction. This method has some distinct advantages, in that it does not consume any considerable amount of power and does not take up any space. Unfortunately it is limited to the vertical direction. If an image sensor with a Bayer colour filter pattern is used, charges will have to be moved up or down two rows at a time to match the color filter pattern, see FIG. 10. With a monochrome sensor charges can be moved one row at a time.

Figure 11:
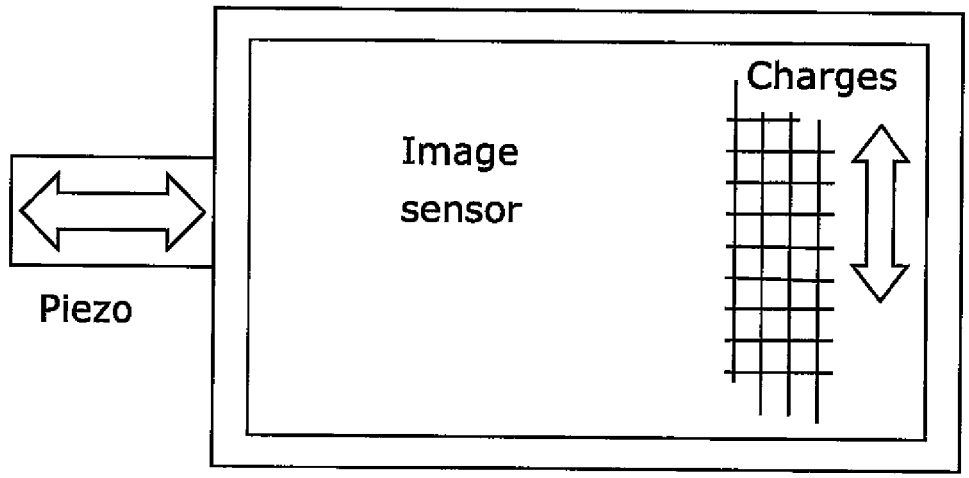
FIG. 11 shows moving of the imaging sensor horizontally using a single piezo element or other micro-positioning device, and moving the pixels in the imaging sensor vertically.

A combination of moving the imaging sensor horizontally using a single piezo element or other micro-positioning device, and moving the pixels in the imaging sensor vertically, see FIG. 11. This combination makes it possible to follow the projected image in both the horizontal and vertical direction at a lower cost, lower power consumption and using less space than a solution which incorporates two piezo elements.

The vibration pattern is analysed during the exposure cycle. If the acceleration exceeds a certain level for a certain amount of time, which is determined in respect to the exposure time as described in the earlier example, the photographer will receive a warning, which is visual and/or audible and/or attached to the image data. The vibration warning may be automatically turned off by the camera when a flash light is used, since the duration of a flash light burst is very short (<1 ms), thereby reducing the possibility of vibrations during the time when the majority of the light from the exposure hits the imaging sensor.

In most cases where an image is slightly blurred, the image can be improved by applying a sharpening algorithm to the blurred image. With the vibration information at hand, it is possible for the camera to automatically apply an optimum amount of sharpening to a blurred image. Sharpening can be used as an automatic stand-alone module, which can be added to the resulting image from the before mentioned methods, which all contribute to reduce blur in the image.

In certain cases a little vibration of the camera may be advantageous as it reduces the possibility of Moiré artifacts in the captured image due to the induced blur. Again using the information about the movements of the projected image in the imaging plane, will enable the image processing software to produce a developed (processed) image with less tendency to show Moiré artifacts without the full loss of sharpness.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. A method of correcting forward slant in an image recorded by a digital camera with a predetermined orientation, said method comprising:
   providing a first accelerometer integrated on a monolithic chip in the digital camera, the first accelerometer being sensitive to acceleration in a first direction lying in an imaging plane of the digital camera, said first accelerometer being adapted to provide a first output signal in response to acceleration in the first direction;
   providing a second accelerometer integrated on a monolithic chip in the digital camera, the second accelerometer being sensitive to acceleration in a second direction lying in an imaging plane of the digital camera and being different from the first direction, said second accelerometer being adapted to provide a second output signal in response to acceleration in the second direction;
   providing a third accelerometer integrated on a monolithic chip in the digital camera, the third accelerometer being sensitive to acceleration in a third direction normal to the first and second directions, said third accelerometer being adapted to provide a third output signal in response to acceleration in the third direction;
   low-pass filtering the first, second, and third output signals to obtain information relating to static accelerations;
   using the information relating to static accelerations to identify a pitch angle of the digital camera when the image was recorded; and
   correcting forward slant in the recorded image in accordance with the identified pitch angle to reduce the influence of pitch away from a vertical orientation or a horizontal orientation.

2. The method according to claim 1, further comprising using the information relating to static accelerations to identify a roll angle of the digital camera when the image was recorded; and wherein the forward slant correction also utilizes the identified roll angle.

3. The method according to claim 2, further comprising correcting sideways slant in the recorded image in accordance with the identified roll angle to reduce the influence of roll away from the vertical orientation or the horizontal orientation.

4. The method according to claim 1, wherein the forward slant correction is carried out by post-processing software.

5. The method according to claim 1, wherein the forward slant correction is carried out automatically.

6. The method according to claim 1, wherein said first, second, and third output signals are provided as continuous functions of accelerations in the first, second, and third directions.

7. The method according to claim 1, wherein providing said first, second, and third accelerometers comprises using first, second, and third micro-mechanical accelerometers as the first, second, and third accelerometers.

8. The method according to claim 1, further comprising cropping the corrected image to fit a rectangular frame.

9. A non-transitory digital storage holding software configured to perform the method of claim 1 when executed by a processor in the digital camera.

10. A computer program embodied on a non-transitory computer readable medium for correction of forward slant in an image recorded by a digital camera, the non-transitory computer readable medium comprising:
    a first code segment for causing a processor to obtain a first output signal in response to acceleration in a first direction lying in an imaging plane of the digital camera;
    a second code segment for causing the processor to obtain a second output signal in response to acceleration in a second direction lying in an imaging plane of the digital camera and being different from the first direction;
    a third code segment for causing the processor to obtain a third output signal in response to acceleration in a third direction normal to the first and second directions;
    a fourth code segment for causing the processor to low-pass filter the first, second, and third output signals to obtain information relating to static accelerations;
    a fifth code segment for causing the processor to use the information relating to static accelerations to identify a pitch angle of the digital camera when the image was recorded; and
    a sixth code segment for causing the processor to correct forward slant in the image in accordance with the identified pitch angle to reduce the influence of pitch away from a vertical orientation or a horizontal orientation.

11. The non-transitory computer readable medium according to claim 10, wherein the sixth code segment causes the processor to turn correction of the forward slant in the recorded image off and on.

12. A digital camera providing correction of sideways slant of images, the digital camera comprising:
    an image sensor
    a first accelerometer integrated on a monolithic chip in the digital camera, the first accelerometer being sensitive to acceleration in a first direction lying in a plane of the image sensor, said first accelerometer being adapted to provide a first output signal in response to acceleration in the first direction;
    a second accelerometer integrated on a monolithic chip in the digital camera, the second accelerometer being sensitive to acceleration in a second direction lying in a plane of the image sensor and being different from the first direction, said second accelerometer being adapted to provide a second output signal in response to acceleration in the second direction;
    a third accelerometer integrated on a monolithic chip in the digital camera, the third accelerometer being sensitive to acceleration in a third direction normal to the first and second directions, said third accelerometer being adapted to provide a third output signal in response to acceleration in the third direction;
    a processor being configured to process the first, second, and third output signals, said processor comprising a low-pass filter for filtering the first, second, and third output signals to obtain information relating to static accelerations and to use the information relating to static accelerations to identify a pitch angle of the digital camera; and means for automatically correcting forward slant in images in accordance with the identified pitch angle to reduce the influence of pitch away from a vertical orientation or a horizontal orientation.

13. The digital camera according to claim 12, wherein the means for correcting forward slant in the recorded image can be turned off and on.

14. The digital camera according to claim 12, further comprising a digital storage and wherein the means for correcting forward slant in the recorded image comprises software held in the digital storage.

15. The digital camera according to claim 12, wherein the processor is further configured to use the information relating to static accelerations to identify a roll angle of the digital camera, and wherein the means for automatically correcting forward slant also utilizes the identified roll angle.

16. The digital camera according to claim 15, further comprising means for automatically correcting sideways slant in images in accordance with the identified roll angle to reduce the influence of roll away from the vertical orientation or the horizontal orientation.

17. The digital camera according to claim 12, wherein said first, second, and third accelerometers are first, second, and third micro-mechanical accelerometers, and wherein said first, second, and third output signals are continuous functions of accelerations in the first, second, and third directions.

* * * * *